Patented Jan. 2, 1951

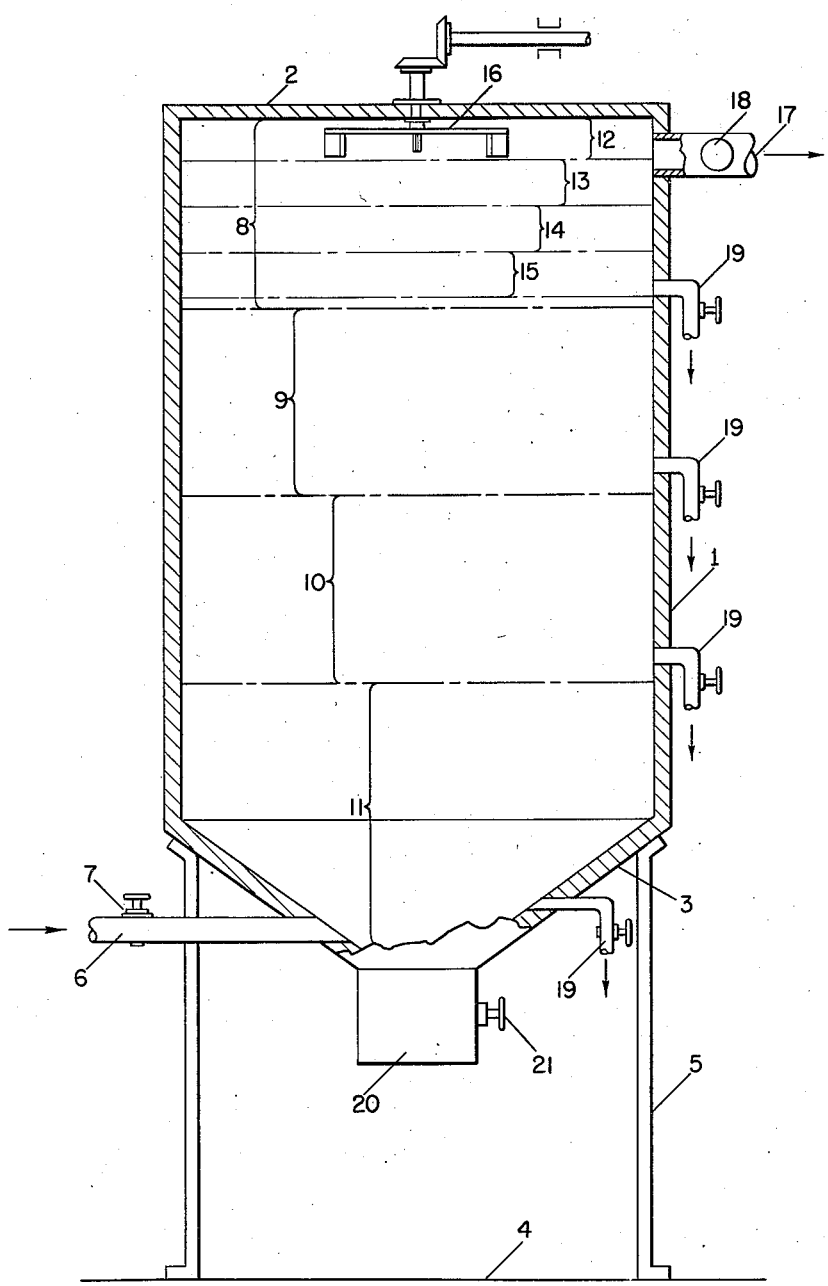

2,536,993

UNITED STATES PATENT OFFICE 2,536,993

CONTINUOUS FERMENTATION PROCESS

Victor Manuel Cremaschi, Gral, Alvear, Argentina

Application May 24, 1947, Serial No. 750,255
In Argentina May 29, 1946

5 Claims. (Cl. 99—35)

The present invention refers to a continuous fermentation process for fermenting crushed grapes, its main object being to provide a fermentation process which, due to its advantageous features and high efficiency, offers evident advantages as compared with all other processes and methods that, to the same end and purpose, have been proposed and used to date.

According to known fermentation systems, the ground grapes are put in a vat and, once this container is full, are allowed to remain for four days, i. e., the time required for fermentation. After this period has elapsed, the contents of the tank are "de-vatted," that is to say, the wine thus elaborated is extracted, the withdrawal taking place from the lower portion of the vat in question.

Once the wine has been removed, the same operation is performed with the fermented pomace, which forms what in this branch of industry is sometimes called the "topping."

The above mentioned process has several drawbacks which have a negative effect on the continuity and efficiency of the system, in fact, continuous manufacture is not possible and a certain loss of time is brought about through the necessity of emptying each one of the fermentation vats, so as to be able to fill them anew.

In order to avoid these difficulties, the process of this invention has been devised, whereby continuous fermentation is possible, together with the consequent advantages in so far as operation efficiency and quality of the product are concerned.

The invention likewise contemplates other accessory objects that will be made clear during the course of the present description.

In order that this invention may be more clearly understood and readily put into execution, a preferred embodiment of same is illustrated in connection with the attached drawing, said illustration to be considered as an example and in no ways as a limitation upon the invention. The drawing is a diagrammatic illustration of an apparatus designed specially for putting into practice the invention described herein.

The continuous fermentation process of this invention, consists mainly in the daily introduction of the crushed grapes through the lower portion of a tank or vat having a carrying capacity sufficient for holding the product of four days crushing operation, one fourth of which capacity is introduced at a time, strata or layers being formed according to density in the upper portion of said tank or vat, the layer or stratum of wine and skins and pulp being removed from the upper part of the tank or vat.

In general, the improved continuous fermentation process of the present invention for the production of wine from crushed grapes includes the maintenance, in an upright fermentation vat, under fermenting conditions, of a column of liquid including grape must in progressively advanced stages of fermentation from the bottom to the top of the vat with the grape skins and pulp from the crushed grapes floating at the top of the column of liquid, feeding crushed grapes into the vat at the bottom portion thereof and subjecting them to fermenting conditions therein, maintaining conditions in the vat such that the carbon dioxide formed by the fermentation of the grapes aids in floating the skins and pulp of the introduced crushed grapes to the top of the column of liquid in the vat, withdrawing skins and pulp from the top portion of the vat, withdrawing wine from the uppermost portion of the column of liquid in the vat, and withdrawing grape seeds and other solid matter from the bottom portion of the vat.

In order to put into practice the above described process, a tank or vat such as illustrated in the drawing is employed which, as shown in said figure, comprises a body 1, closed above by a cover 2 and below by a bottom 3, the capacity of this tank or vat, as has already been said, being equivalent to several days of grape crushing operations.

This assembly is supported at a certain height above the ground level 4, by means of a supporting framework 5.

The crushed grapes are introduced daily through the lower portion of said tank or vat 1, by means of a feed conduit 6, provided with its corresponding valve 7, sufficient crushed grapes being introduced to fill one fourth of the total holding capacity of said tank or vat, consequently, at the end of the fourth day, four layers or liquid strata will have been formed within the tank or vat, these layers or strata consisting respectively, in order of ascension, of:

A zone 8, of finished wine, in a warm condition.

A zone 9, of half-finished wine or must, at a lower temperature.

A zone 10, of half-finished wine or must, at still lower temperature than the former, and finally:

A zone 11, of fresh, cold crushed grapes and cap or grape must.

Consequently, the fresh crushed grapes that are put into the vat each day will occupy, owing to their lower temperature and higher density, the lower stratum 11, while the portion put into the tank the day before, in which fermentation has already commenced, will place itself in layer 10, immediately above the former, until, at the end of the fourth day, the position designated as stratum 8 has been reached.

The skins and pulp of the crushed grapes, owing to the fact that they are lighter than the juice or must proper, will immediately ascent within the liquid column itself, being added to the grape skins and pulp of the day before, thus bringing about an automatic cooling of the warmer wine occupying the upper stratum 8.

At the end of four days, the grape skins and pulp will have been distributed over the upper portion of the tank or vat 1, segregated as to density and forming four layers or stratums consisting, from above downwards, of the following:

A stratum 12, comprising a fully fermented cap of grape skins and pulp,

A stratum 13, comprising the cap fermented to a lesser degree,

A stratum 14, consisting of the cap fermented to a still lesser degree and, finally:

A stratum 15 formed by fresh floating pomace.

If under these circumstances crushed grapes are continually fed into the tank, at the end of the fifth day, always bearing in mind that the crushed grapes are fed through feed pipe 6 and that simultaneously a rotary cap extractor such as the plough-like means shown at 16 is to be put in motion, an equivalent quantity of finished wine and fermented cap may be withdrawn from the upper conduit 17, said finished wine and fermented cap corresponding to the feeding effected several days before. This operation may be repeated daily and continually, in quantities perfectly controlled by valve 18. Since carbon dioxide gas is evolved in the fermentation of the grapes in the vat, small bubbles of this gas, as formed, in accordance with a well-known principle, adhere to the grape skins and pulp, thereby aiding in the floating of these materials through the liquid to the upper portion of the vat.

The product withdrawn from conduit 17 is submitted to the usual processes, accomplished by means of devices such as presses and other industrial equipment, in order to separate the wine from the cap of fermented skins and pulp.

From the drawing it will be observed, furthermore, that tank or vat 1 is equipped with certain accessories comprising valves or cocks 19, arranged at different heights, for moving the liquid and extracting samples, and an outlet 20, centrally situated in bottom 3 and provided with its corresponding valve or cock 21, for separating the lees or dregs, seeds and other solid matter which, owing to its greater density, may have become accumulated at the bottom.

The invention as described may be clearly understood, and no further explanations will be required by those versed in the matter.

Evidently, divers modifications as to construction and detail may be incorporated without thereby departing from the essential nature of the present invention as clearly defined in the following claims:

Improvements in the process and apparatus of the present invention are disclosed and claimed in my co-pending application, Serial No. 45,742, filed August 23, 1948 now Patent No. 2,536,994 of January 2, 1951—has been inserted.

I claim:

1. A continuous process for the fermentation of crushed grapes to produce wine, which comprises maintaining in an upright fermentation vat under fermenting conditions a column of liquid including grape must in progressively advanced stages of fermentation from bottom to top of the column of liquid in the vat with skins and pulp from the crushed grapes floating at the top of the column of liquid, feeding crushed grapes into said vat at the bottom portion thereof and subjecting them to fermenting conditions therein, maintaining conditions in the vat such that the carbon dioxide formed by the fermentation of the grapes aids in floating the skins of the introduced crushed grapes to the top of the column of liquid in the vat, withdrawing fermented cap of grape skins and pulp from the top portion of the vat, withdrawing wine from the uppermost portion of the column of liquid, and withdrawing grape seeds and other solid matter from the bottom portion of the vat.

2. A process as claimed in claim 1 characterized by maintaining progressively higher temperatures in the column of liquid from the bottom thereof.

3. A continuous process for the production of wine by the fermentation of crushed grapes in an upright fermentation vat, which comprises introducing the crushed grapes to be fermented into the lower portion of the vat to substantially fill the vat and thereby provide a column of liquid, initiating the fermentation of the crushed grapes as they are produced into the vat, floating the skins and pulp of the introduced crushed grapes to the upper portion of the column of liquid in the vat, separately withdrawing grape skins and wine from the upper portion of the vat, continuing the introduction of crushed grapes into the lower portion of the vat, maintaining vertically arranged zones of fermentation in the vat in which the grape must is at progressively advanced stages of fermentation from the lower portion to the upper portion of the vat, progressively moving grape must upwardly through the zones as crushed grapes are introduced into the vat, continuing the withdrawal of grape skins and wine from the upper portion of the vat as crushed grapes are introduced into the lower portion of the vat, and withdrawing grape seeds and other solid matter from the bottom portion of the vat.

4. A process as claimed in claim 3 characterized by maintaining progressively higher temperatures upwardly through the fermentation zones.

5. A process as claimed in claim 3 characterized by moving grape skins and pulp at the top of the column of liquid toward the periphery of the vat for withdrawal.

VICTOR MANUEL CREMASCHI.

REFERENCES CITED

The following references are of record in the file of this patent:

UNITED STATES PATENTS

| Number | Name | Date |
|---|---|---|
| 878,790 | Freund | Feb. 11, 1908 |
| 1,510,195 | Romer | Sept. 30, 1924 |
| 1,806,698 | Miller | May 26, 1931 |
| 2,371,208 | Alzola | Mar. 31, 1945 |